(12) United States Patent
Rumney (10) Patent No.: US 7,496,130 B2
(45) Date of Patent: Feb. 24, 2009

(54) METHOD AND APPARATUS FOR PREDICTING A SIGNALLING CODE CORRESPONDING TO A CODE SPUR

(75) Inventor: Moray Denham Rumney, Edinburgh (GB)

(73) Assignee: Agilent Technologies, Inc., Santa Clara, CA (US)

( * ) Notice: Subject to any disclaimer, the term of this patent is extended or adjusted under 35 U.S.C. 154(b) by 965 days.

(21) Appl. No.: 10/668,547

(22) Filed: Sep. 23, 2003

(65) Prior Publication Data

US 2004/0062296 A1    Apr. 1, 2004

(30) Foreign Application Priority Data

Sep. 24, 2002    (EP) ................................. 02256624

(51) Int. Cl.
*H04B 1/69*    (2006.01)
*H04B 1/707*    (2006.01)
(52) U.S. Cl. ..................... 375/146; 375/295; 375/296
(58) Field of Classification Search .............. 375/130, 375/140, 146, 295, 296
See application file for complete search history.

(56) References Cited

U.S. PATENT DOCUMENTS 6,028,884 A * 2/2000 Silberger et al. ............ 375/130

6,191,652 B1 * 2/2001 Gentzler .......................... 330/52
2001/0008542 A1 * 7/2001 Wiebke et al. .............. 375/141
2002/0172264 A1 * 11/2002 Wiberg et al. ............... 375/147

FOREIGN PATENT DOCUMENTS

WO    WO 99/59265    11/1999
WO    WO 01/18987 A1    3/2001

OTHER PUBLICATIONS

"Nonlinear Amplification of CDMA Waveforms: An Analysis Of Power Amplifier Gain Errors And Spectral Regrowth", Braithwaite, Vehicular Technology Conference, 1998, IEEE, pp. 2160-2166.
"Peak-To-Average Ratio (PAR) Reduction By Walsh-Code Selection For IS-95 And CDMA2000 Systems", Lau, IEE Proceedings: Communications, Institution of Electrical Engineers, vol. 147, No. 6, pp. 361-364.
"Submission Of Composite Rho Proposal To 3GPP RAN WG4", Hewlett Packard Ltd., 3GPP TSG RAN WG4 'Online!, 1999, pp. 1-17.

* cited by examiner

*Primary Examiner*—Shuwang Liu
*Assistant Examiner*—David Huang
(74) *Attorney, Agent, or Firm*—Marc Bobys (57) ABSTRACT

The existence of non-linearities in a spread-spectrum communications system can result in a transmitter generating code spurs projecting onto channels used to communicate information symbols between a transmitter and a receiver. The present invention provides a method of predicting at least one signalling code corresponding to at least one respective code spur by performing vector products of signalling codes expressed in a bipolar form to yield a signalling code where a code spur will occur.

7 Claims, 4 Drawing Sheets

METHOD AND APPARATUS FOR PREDICTING A SIGNALLING CODE CORRESPONDING TO A CODE SPUR

BACKGROUND

The present invention relates to an apparatus for predicting a signalling code corresponding to a code spur of the type occurring, for example, in a spread spectrum communications system, such as a Code Division Multiple Access (CDMA) system. The present invention also relates to a method of predicting the above-mentioned signalling code corresponding to the code spur.

BRIEF DESCRIPTION OF RELATED DEVELOPMENTS

CDMA systems allow the transmission of multiple channels of information on the same frequency at the same time. Unlike traditional communications systems, where an information symbol is represented directly using some form of carrier modulation, in a CDMA system, each information symbol is represented by modulating the carrier using a sequence, or code, longer than the symbol. For example, at a transmitter each information channel is assigned a unique signalling code of a known length such that the information symbol rate of each channel is converted or "spread" to a common higher modulation rate (chip rate) for the particular system. The individual channels are then summed to create a composite signal, which is transmitted by the communication system. The codes chosen for each channel are mathematically orthogonal, such that the dot product of any two codes is zero. At a receiver, the received composite signal is projected onto one of the codes used in the spreading process, the output of the projection being the original symbol data that was spread in the transmitter using that code. The use of different length spreading codes (spreading factors) allows for channels with different symbol data rates to be spread up to the common system chip rate.

Although CDMA systems provide many benefits, one challenge of such systems is the management of Peak-to-Average Power Ratios (PARS) of signals, influenced by the highly time-varying power profile of the composite signal. In this respect, the greater the number of channels that are combined, the more likely the instantaneous power of a given composite signal will increase as compared to the average, an objective being the maintenance of the PAR of the given composite signal below a predetermined PAR of, for example, 10 dB. It is typical of many composite CDMA signals to approximate gaussian noise such that there is a 0.001% probability that the signal will exceed 10 dB above the average power. However, even within a range of 10 dB, in practical transmission systems such signals require the use of a transmitter having a wide linear dynamic range in order to be able to maintain a linear transmission path, a desirable requirement. In order to provide a linear transmitter capable of handling a signal that has peaks 10 dB above the average power, the instantaneous power handling of the transmitter typically needs to be ten times greater than the average power of the signal.

If the composite signal is not linearly amplified, compression of the peaks of the signal can occur which inevitably leads to third order intermodulation products (spectral regrowth) in the adjacent channels. The capacity of any multi-frequency CDMA system is heavily dependent on controlling spectral regrowth, in order to prevent severe reduction of the capacity of the adjacent channels by the added noise. In practice, transmitters are not perfectly linear and so many techniques are employed to ensure that excessive spectral regrowth does not occur. These include feed-forward and pre-distortion linearization techniques in amplifiers to try to extend the linear operating range. Another popular technique is clipping, which limits the peaks of the composite signal. This method can extend the operating range of a transmitter by several decibels, which is highly valuable in either reducing spectral regrowth or allowing the use of lower cost amplifiers with less headroom.

Although clipping helps deal with adjacent channel spectral regrowth problems, its use inevitably leads to a degradation of the quality of in-channel modulation, since some of the energy that should have been transmitted is lost. This degradation can lead to errors in the demodulation process, or a loss of margin in the channel with regard to other factors such as noise from interference sources. Consequently, the extent to which a given composite signal can be clipped is limited by the extent to which the composite signal can be de-spread and demodulated. Typical commercial CDMA systems, such as the Third Generation Partnership Project Wideband CDMA (3GPP W-CDMA) system and the Technical Industries of America Interim Standard 95 (TIA IS-95) system therefore specify requirements for the quality of the in-channel modulation of the given composite signal in terms of an Error Vector Magnitude (EVM) or likeness factor Rho. In addition, the 3GPP W-CDMA system specifies a limit to the degree the, so-called, modulation error vector can project onto any one code in the code domain at a specified spreading factor.

There is, however, also a less obvious consequence of the above-mentioned lost energy, namely the distribution of error energy within the code domain. If the error energy is random, it will project equally with all codes in the code domain leading to a general but small loss of margin on any code actively being used as a transmission channel. However, if the error energy happens to project onto another code, but not with all or a large number of codes, a significant unwanted error signal or code spur is seen by the receiver on the code in question.

In the code domain, it can readily be seen that a typical error vector generated by clipping the composite signal does not result in an even distribution of the error across the code domain. Consequently, in order to maximise system performance, it is desirable for the error energy to project onto unused codes so that the natural orthogonality of the CDMA system works to the benefit of the modulation quality of the active or used channels.

The underlying principle behind the generation of code spurs in the code domain is not dissimilar to that which is well known in the frequency domain. In this respect, when two sine waves at different frequencies $f_1$ and $f_2$ are added linearly, in the frequency domain, the frequency domain will only contain the original frequencies. If however the two signals are allowed to pass through a non-linear transformation such as an amplifier in compression, the two signals will multiply together producing new frequency components, the most problematic usually being the generation of the third order intermodulation products at $2f_1-f_2$ and $2f_2-f_1$.

In an ideal CDMA transmitter, the generation of the composite signal is the result of a linear combination of spread channels. If, however, the transmitter is either compressed or has had deliberate distortion added such as signal clipping, intermodulation products, by analogy with the frequency domain example above, will be generated.

It is generally assumed that the product of any two spreading codes of the same length create a new third code. If the third new code does not coincide with one of the codes chosen to transmit the original signal, then, as intimated above, the impact on the quality of the active channels when despread would be minimal due to the orthogonality of the codes. However, if the error energy falls primarily on, i.e. coincides with, a used or active code, the quality of the despread channels will degrade further as there is no orthogonality between the wanted signal and the error vector. It is therefore desirable to be able to predict how the error vector is represented in the code domain.

In the modulation domain, spreading codes are represented by the Binary Phase Shift Keying (BPSK) modulation values of +1 and −1. Table 1 lists a set of Orthogonal Variable Spreading Factor (OVSF) codes, of length 8, taken from the 3GPP W-CDMA standard, the codes being identified using bit-reversed Hadamard index numbering. In general, for a spreading factor of $2^n$, a particular OVSF code can be identified as $C_n$(index). For example, the sixth code in the sequence below $(1, -1, 1, -1, -1, 1, -1, 1)$ is denoted as $C_3(5)$.

TABLE 1

| Index | OVSF Code | | | | | | | |
|---|---|---|---|---|---|---|---|---|
| 0 | 1 | 1 | 1 | 1 | 1 | 1 | 1 | 1 |
| 1 | 1 | 1 | 1 | 1 | −1 | −1 | −1 | −1 |
| 2 | 1 | 1 | −1 | −1 | 1 | 1 | −1 | −1 |
| 3 | 1 | 1 | −1 | −1 | −1 | −1 | 1 | 1 |
| 4 | 1 | −1 | 1 | −1 | 1 | −1 | 1 | −1 |
| 5 | 1 | −1 | 1 | −1 | −1 | 1 | −1 | 1 |
| 6 | 1 | −1 | −1 | 1 | 1 | −1 | −1 | 1 |
| 7 | 1 | −1 | −1 | 1 | −1 | 1 | 1 | −1 |

As mentioned above, it is a generally accepted principle that any two codes at the same spreading factor will multiply in the presence of non-linearities in the transmission path to yield the above-mentioned intermodulation products. By way of example, if codes $C_3(3)$ and $C_3(5)$ are combined using a non-linear function, for example by clipping or compression, a code spur might be expected on the code generated given by the vector product of $C_3(3)$ and $C_3(5)$. This expands to:

$$\begin{array}{rrrrrrrrr} & 1 & 1 & -1 & -1 & -1 & -1 & 1 & 1 \\ \times & 1 & -1 & 1 & -1 & -1 & 1 & -1 & 1 \\ = & 1 & -1 & -1 & 1 & 1 & -1 & -1 & 1 \end{array}$$

From Table 1 above, it can be seen that the sequence 1, −1, −1, 1, 1, −1, −1, 1 matches index number 6 and so, in the first instance, it would appear that, in the presence of non-linear transmission, $C_3(3) \times C_3(5)$ might be expected to produce a code spur at $C_3(6)$.

However, in practice, two codes on their own from the same orthogonal set in the code domain do not generate any additional codes when subject to typical clipping levels, for example, by circular clipping the modulus of a complex signal to 50%. Therefore, this principle can not be used to predict code spurs for signals having multiple active channels.

SUMMARY

According to a first aspect of the present invention, there is provided a method of predicting a signalling code from an $n^{th}$ order set of orthogonal signalling codes of length $2^n$ for a communications system, the signalling code corresponding to a code spur, comprising the steps of: selecting an odd number of at least three signalling codes from the $n^{th}$ order set of orthogonal signalling codes within a code space; and performing an operation on the at least three signalling codes, the operation corresponding to a vector product of the at least three signalling codes, when the at least three signalling codes are expressed in a bipolar form, to predict the signalling code corresponding to the code spur.

The at least three signalling codes may comprise a plurality of signalling codes, the method further comprising the step of: generating the plurality of signalling codes as a substitute for another signalling code, the another signalling code occupying a portion of the code space and being a member of an $(n-x)^{th}$ set of orthogonal signalling codes of length $2^{(n-x)}$, where x is less than n and the plurality of signalling codes are orthogonal with each other and occupy substantially all of the portion of the code space. The plurality of signalling codes may be members of a further set of signalling codes of order $(n-x+1)$. Each of the plurality of signalling codes may comprise the another signalling code or a bit inverse thereof concatenated with the another signalling code or the bit inverse thereof, and the each of the plurality of signalling codes constituting an orthogonal signalling code with respect to other signalling codes of the plurality of signalling codes.

The at least three signalling codes may be less than or equal to nine signalling codes. The at least three signalling codes may be less than or equal to seven signalling codes. The at least three signalling codes may be less than or equal to five signalling codes. The at least three signalling codes may be three signalling codes.

In an embodiment of the invention, a method is provided of assigning spreading codes for a spread-spectrum communications system, the method comprising: compiling a plurality of combinations of orthogonal signalling codes; for odd combinations of at least three orthogonal signalling codes from each of the plurality of combinations of signalling codes, predicting at least one signalling code corresponding to at least one respective code spur using the method as set forth in accordance with the first aspect of the present invention; identifying a combination of signalling codes from the plurality of combinations of signalling codes having a lower occurrence of code spurs coinciding with active signalling codes than other combinations of signalling codes amongst the plurality of combinations of signalling codes.

According to a second aspect of the present invention, there is provided a computer program element comprising computer program code means to make a computer execute the method as in accordance with the first aspect of the present invention. The computer program element may be embodied on a computer readable medium.

In another embodiment of the invention, there is provided a signalling code domain comprising a combination of active signalling codes generated using the method as set forth above.

According to a third aspect of the present invention, there is provided a transmitter apparatus for a spread-spectrum communications system, the apparatus comprising: a transmitter chain; and a processor coupled to the transmitter chain, the processor being arranged to select an odd number of at least three signalling codes from the $n^{th}$ order set of orthogonal signalling codes within a code space, and perform an operation on the at least three signalling codes, the operation corresponding to a vector product of the at least three signalling codes, when the at least three signalling codes are expressed in a bipolar form, to predict the signalling code corresponding to the code spur.

In a further embodiment, there is provided a base station comprising the transmitter apparatus set forth above, the base station being for example part of a spread-spectrum communications system.

According to a fourth aspect of the present invention, there is provided a use of a vector product of signalling codes expressed in a bipolar form to predict a signalling code corresponding to a code spur.

It is thus possible to predict one or more signalling codes respectively corresponding to one or more code spurs and thereby, if required, appropriately select a subset of signalling codes for use in a communications system employing, for example, a CDMA scheme, that will obviate or at least mitigate the above-mentioned problems associated with code spurs. A further advantage that flows from the ability to select the subset of signalling codes is the ability to control the EVM and Peak Code Domain Error (PCDE) of a signal to be transmitted so as to maintain the EVM and PCDE within acceptable parameters.

BRIEF DESCRIPTION OF THE DRAWINGS

At least one embodiment of the invention will now be described, by way of example only, with reference to the accompanying drawings, in which.

DETAILED DESCRIPTION

Figure 1:
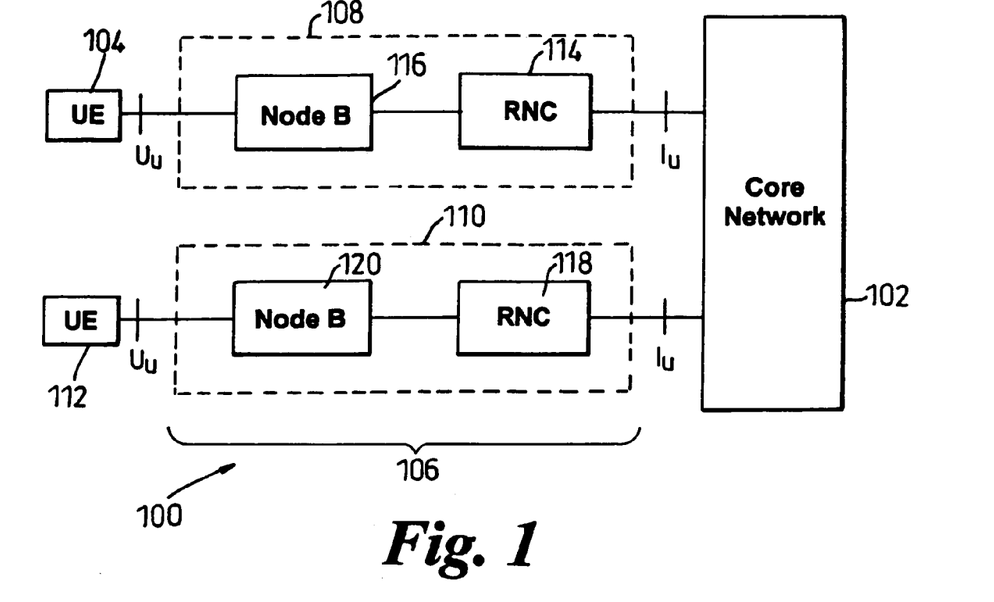
FIG. 1 is a schematic diagram of a communications system.

Referring to FIG. 1, a communications system 100, for example, a Universal Mobile Telecommunications System (UMTS) employs a multiple access technique, for example a spread-spectrum multiple access technique, such as a W-CDMA technique.

The UMTS comprises a core network 102 capable of communicating with a first User Equipment (UE) unit 104 via a UMTS Terrestrial Radio Access Network (UTRAN) 106. The core network 102 communicates with the UTRAN 106 via a first interface $I_U$. The first UE unit 104 is capable of communicating with the UTRAN 106 via a Radio Frequency (RF) interface $U_U$. In accordance with the UMTS standard, the core network 102, the UTRAN 106 and the first UE unit 104 provide an access stratum (not shown) and a non-access stratum (not shown). The UTRAN 106 comprises a first Radio Network Subsystem (RNS) 108 and a second RNS 110, the first and second RNSs 108, 110 being capable of communicating with the core network 102. The first RNS 108 is also capable of communicating with the first UE unit 104, the second RNS 110 being capable of communicating with a second UE unit 112.

The first RNS 108 comprises a first Radio Network Controller (RNC) 114 capable of communicating with the core network 102 and coupled to a first Node B 116, the first Node B 116 being capable of communicating with the first UE unit 104. The second RNS 110 comprises a second Radio Network Controller (RNC) 118 capable of communicating with the core network 102 and coupled to a second Node B 120, the second Node B 120 being capable of communicating with the second UE unit 112.

Although, in this example, reference is being made to the first and second Node Bs 116, 120 and the first and second UE units 104, 112, it should be appreciated that these entities are merely exemplary and other appropriate entities are intended when in the context of other communications systems.

Figure 2:
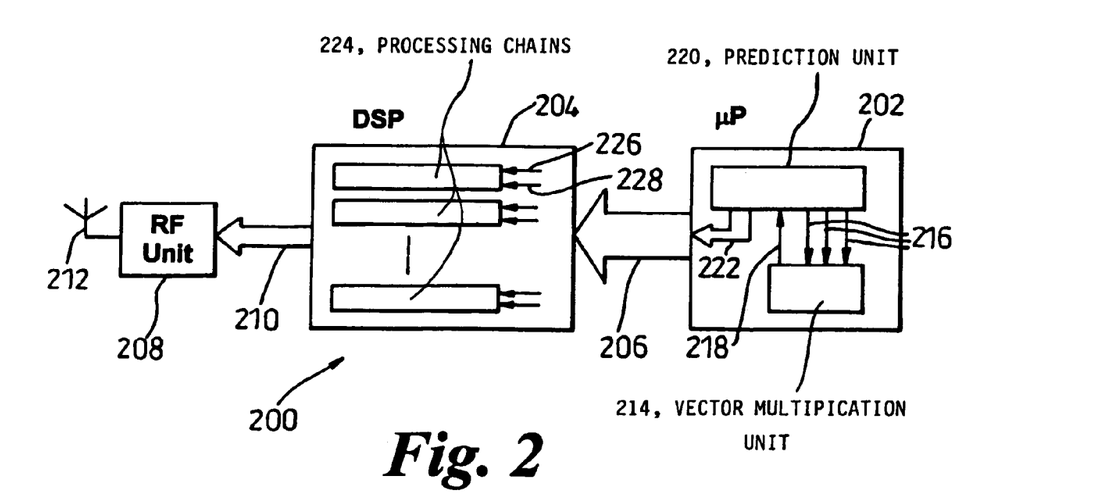
FIG. 2 is a schematic diagram of a transmitter apparatus of FIG. 1 constituting an embodiment of the invention.

Referring to FIG. 2, the first and/or second Node Bs 116, 120 comprise a transmitter apparatus 200. For the purposes of simplicity and clarity of description, only the basic units of a transmitter apparatus 200 directly relevant to the present invention will be described herein. The skilled person will readily appreciate the more detailed aspects of any necessary hardware and/or software.

The transmitter apparatus 200 comprises a microprocessor 202 coupled to a Digital Signal Processor (DSP) 204 by a first data bus 206. If required, a Field Programmable Gate Array (FPGA) can be substituted in place of the DSP 204. The DSP 204 is coupled to an RF unit 208 by a second data bus 210, the RF unit 208 being coupled to an antenna 212.

As would be understood by the skilled person, both the microprocessor 202 and the DSP/FPGA 204 are appropriately programmed to perform functionality required in order to support the operation of the first and/or second Node B 116, 120.

In this example, the microprocessor 202 is additionally arranged to perform an operation on code data received via at least three inputs 216 to a vector multiplication unit 214, the at least three inputs being respectively coupled to at least three outputs of a code prediction/allocation unit 220. An output 218 of the vector multiplication unit 214 is also coupled to the code prediction/allocation unit 220, and a code allocation output 222 of the code prediction/allocation unit 220 is arranged to provide data to the first data bus 206.

The DSP 204 comprises a number of processing chains 224, one for each channel of the system 100. Each processing chain comprises a code input 226 and a symbol input 228. The RF unit 208 comprises necessary hardware and/or software to convert digital data provided by the DSP 204 into the RF domain for propagation via the antenna 212.

In operation (FIG. 3), the code allocation/prediction unit 220 generates (step 300) a first set of codes that the transmitter apparatus 200 proposes using for transmitting data to a number of UE units. In this example, four signalling, or spreading, codes are being employed for transmitting data from the transmitter apparatus of the first Node B 116 to four UE units (only one shown in FIG. 1). The codes constituting the first set of signalling codes are orthogonal.

Figure 4:
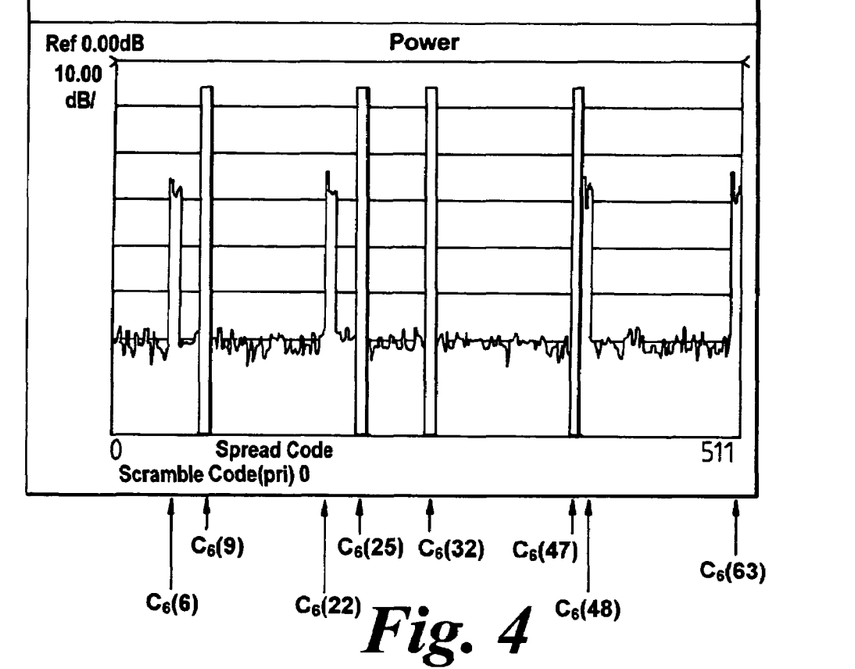
FIGS. 4 to 7 are screen shots of measured sampled signals and active signalling codes.

Once generated, the prediction unit 220 determines (step 302) if the signalling codes of the first set of signalling codes are all of a same order. In the context of spread-spectrum, the order of signalling codes is the spreading factor, or code level, of the spreading codes. Referring to FIG. 4, the first set of signalling codes comprises a first signalling code $C_6(9)$, a second signalling code $C_6(25)$, a third signalling code $C_6(32)$ and a fourth signalling code $C_6(47)$. When the first, second, third and fourth signalling codes $C_6(9)$, $C_6(25)$, $C_6(32)$, $C_6(47)$, are respectively used to spread data, due to the previously mentioned non-linearities, a first code spur is generated on a channel corresponding to a first spur code $C_6(6)$, a second code spur is generated on a channel corresponding to a second spur code $C_6(22)$, a third code spur is generated on a channel corresponding to a third spur code $C_6(48)$ and a fourth code spur is generated on a channel corresponding to a fourth spur code $C_6(63)$. For the avoidance of doubt, it should be understood that the term "spur codes", refers to signalling codes corresponding to code spurs. In order to predict the first, second, third and fourth spur codes $C_6(6)$, $C_6(22)$, $C_6(48)$, $C_6(63)$, the prediction unit 220 provides the vector multiplication unit 214 with combinations of the first, second, third and fourth signalling codes $C_6(9)$, $C_6(25)$, $C_6(32)$, $C_6(47)$. The vector multiplication unit 214 calculates (step 304) vector products of the combinations of signalling codes received from the prediction unit 220, the results of the vector product calculation being returned to the prediction unit 220 by the vector multiplication unit 214. It should be understood that thee signalling codes, of which combinations are provided to the vector multiplication unit 214, are expressed in bipolar form. If expressed in a binary form, using the mapping (1, −1) maps to (0, 1), the vector multiplication unit 214 can be replaced with an exclusive OR combinatorial logic function.

The combinations of signalling codes provided by the prediction unit 220 to the vector multiplication unit 214 are combinations of at least three of the signalling codes, the number of signalling codes in a given combination of signalling codes, being an odd number. The number of possible combinations of a given number, r, of signalling codes in a given set of t signalling codes is given by the expression:

$$\frac{t!}{(t-r)!r!}$$

The calculations according to the above expression for odd numbered combinations of signalling codes is shown in Table II below.

of the product of two OVSF codes. This relationship holds for both the Hadamard numbering of the Walsh codes in IS-95 & CDMA2000 as well as the bit-reversed hadamard code numbering used in the 3GPP W-CDMA system. The exclusive OR operation works for any odd number of codes so the code index of the product of $C_n(x)$, $C_n(y)$ and $C_n(z)$ is given by $x \oplus y \oplus z$.

Referring back to FIG. 3, it is conceivable that one or more of the first, second, third or fourth spur codes $C_6(6)$, $C_6(22)$, $C_6(48)$, $C_6(63)$ coincides with one or more of the first, second, third or fourth signalling codes $C_6(9)$, $C_6(25)$, $C_6(32)$, $C_6(47)$ that the prediction unit 220 proposes using as active signalling codes for transmitting data. In such circumstances, the processor 202 determines (step 306) whether or not the calculated coincidence(s) of signalling codes constitutes an acceptable level of degradation in transmission quality. If the signalling code coincidence(s) is/are acceptable, the first set of signalling codes generated by the prediction unit 220 are passed to the DSP 204 via the first data bus 206. If, however, in the present example, the first set of signalling codes result in an unacceptable level of code spurs coinciding with codes to be used to transmit data, i.e. active signalling codes, the prediction unit 220 determines (step 308) if another set of, thus far ungenerated, signalling codes can be generated. If no further sets of signalling codes can be generated, the most acceptable set of signalling codes is passed (step 310) to the

TABLE II

| Number of active codes | Combinations of 3 codes | Combinations of 5 codes | Combinations of 7 codes | Combinations of 9 codes | Total number of code spurs | Total number of codes |
|---|---|---|---|---|---|---|
| 1 | 0 | 0 | 0 | 0 | 0 | 1 |
| 2 | 0 | 0 | 0 | 0 | 0 | 2 |
| 3 | 1 | 0 | 0 | 0 | 1 | 4 |
| 4 | 4 | 0 | 0 | 0 | 4 | 8 |
| 5 | 10 | 1 | 0 | 0 | 11 | 16 |
| 6 | 20 | 6 | 0 | 0 | 26 | 32 |
| 7 | 35 | 21 | 1 | 0 | 57 | 64 |
| 8 | 56 | 56 | 8 | 0 | 120 | 128 |
| 9 | 84 | 126 | 36 | 1 | 247 | 256 |
| 10 | 120 | 252 | 120 | 10 | 502 | 512 |

It should be noted that the total number of possible different codes is always equal to $2^{n-1}$, where n is the number of active codes. However, in most circumstances, many code spurs will project onto used codes or other code spurs and therefore there will be fewer discrete code spurs in the code domain.

Therefore, in the present example, only four combinations of subsets of three signalling codes are possible and need to be calculated by the vector multiplication unit 214. Calculation of the vector products of the four combinations of three of the first, second, third and fourth signalling codes $C_6(9)$, $C_6(25)$, $C_6(32)$, $C_6(47)$, respectively reveals the first, second, third and fourth spur codes $C_6(6)$, $C_6(22)$, $C_6(48)$, $C_6(63)$; in the context of active signalling codes being used to transmit data, the signals to which the signalling codes correspond being subject to non-linearities, the codes spurs respectively at the first, second, third and fourth spur codes $C_6(6)$, $C_6(22)$, $C_6(48)$, $C_6(63)$ can be seen in FIG. 4.

As a convenience for calculation of the code spur spreading code, in the above examples performing an exclusive OR operation on the binary representation of the code indices of any one orthogonal set generates the index number in that set DSP 204, otherwise another set of signalling codes is generated (step 312) and the analysis of steps 302 to 308 is repeated.

Figure 5:
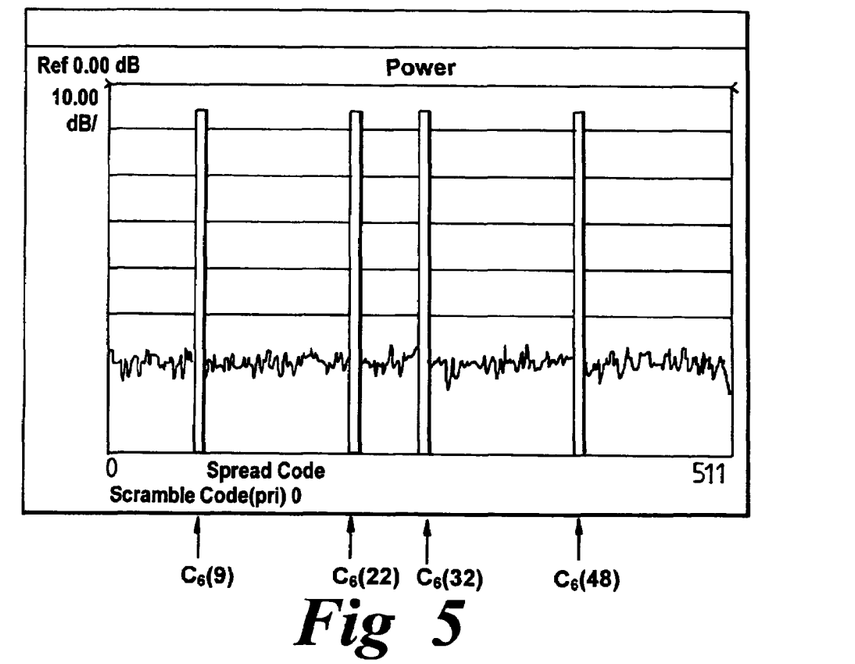

Referring to FIG. 5, if the fourth signalling code $C_6(47)$ is replaced by a fifth signalling code $C_6(48)$, the vector product of combinations of signalling codes from any three of the first set of signalling codes yields a code spur on the other active channel. This is demonstrated by the apparent absence of code spurs in FIG. 5.

In another example (FIG. 6), due to system needs, for example different symbol rates for different channels, the prediction unit 220 generates signalling codes that belong to more than one set of orthogonal signalling codes, each set of signalling codes being of a different order; each set of signalling codes is also a member of an overall domain of signalling codes. For example, the first set of signalling codes now generated by the prediction unit 220 comprises a new first signalling code $C_6(17)$ that is a member of a set of signalling codes of a sixth order, or in this example a spreading factor of 6, and a new second signalling code $C_4(9)$ that is a member of a set of signalling codes of a fourth order, or in this example a spreading factor of 4. The new second signalling code $C_4(9)$ occupies a portion of the code domain.

Figure 6:
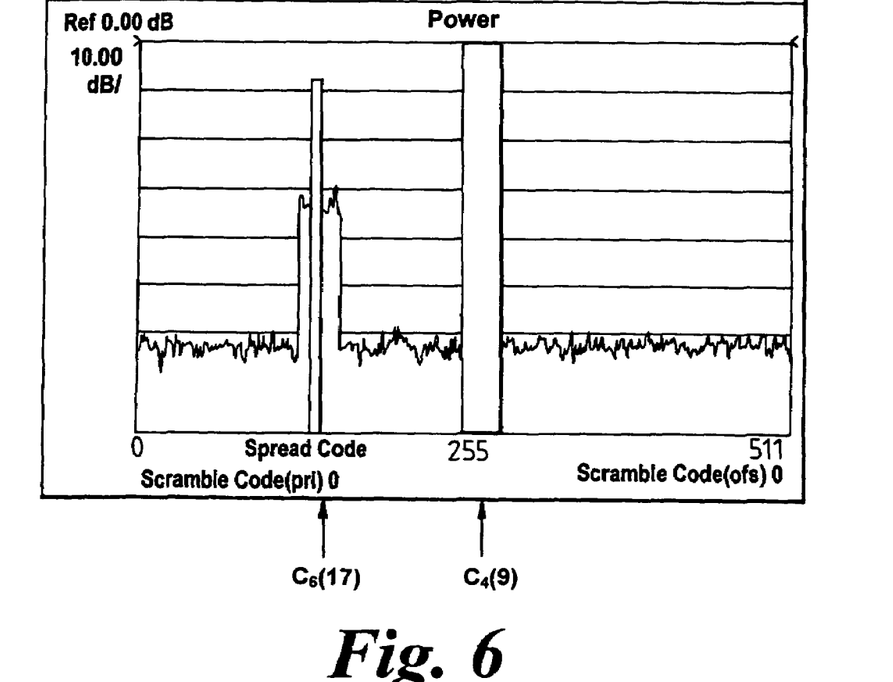

In such circumstances, the prediction unit 220 determines (step 302) that the first set of signalling codes comprises signalling codes that are members of more than one set of codes of different orders. Consequently, the prediction unit 220 identifies (step 314) a highest order number, n, of a set of signalling codes to which the new first and/or second signalling codes $C_6(17)$, $C_4(9)$ belong, i.e. the prediction unit 220 determines, from the first set of signalling codes, the order number of one or more codes of the highest order. Similarly, the prediction unit 220 also identifies (step 316) a lowest order number, n−x, of a set of signalling codes to which the first and/or second new signalling codes $C_6(17)$, $C_4(9)$ belong, i.e. the prediction unit 220 determines, from the first set of signalling codes, the order number of one or more codes of a lowest order.

In order to be able to perform the vector product calculation on combinations of signalling codes from the first set of signalling codes, the signalling codes constituting the first set of signalling codes needs to be members of a single set of orthogonal signalling codes, and hence of a single order. Consequently, the prediction unit 220 substitutes (step 318) any signalling codes that are members of the set of signalling codes of the lowest order, n−x, with codes from the set of signalling codes of the highest order, n. The signalling codes used from the set of signalling codes of the highest order, n, are codes that occupy a same portion, or space, in the code domain as the portion of the code domain that would be occupied by the second new signalling code $C_4(9)$ mentioned above.

However, where x is greater than one, more than one set of substitutions has to take place. In this respect, the process of substituting codes of a first order with codes of a second order is a recursive process. In order to substitute codes of the first order with codes of the second order, it is necessary to carry out a number of intermediate substitutions with signalling codes of orders numerically between n−x and n. In this respect, substitutions with signalling codes from sets of signalling codes of each order numerically between n−x and n with codes numerically higher by an order of unity, i.e. substitution of signalling codes of the $(n-x)^{th}$ order with signalling codes of the $n^{th}$ order, is achieved by means of a series of substitution steps, each step comprising the substitution of codes of an order (n−x+a) with codes of an order of (n−x+a+1), where 'a' is a step counter variable satisfying the following inequality $0 \leq a < x$. The step counter, a, is always, in this example, increased by unity.

For each instance of code substitution of a signalling code of a first order with a signalling code of a second order, a mapping table can be calculated and stored for retrieval by the prediction unit 220 when substitution of signalling codes is required.

Figure 3:
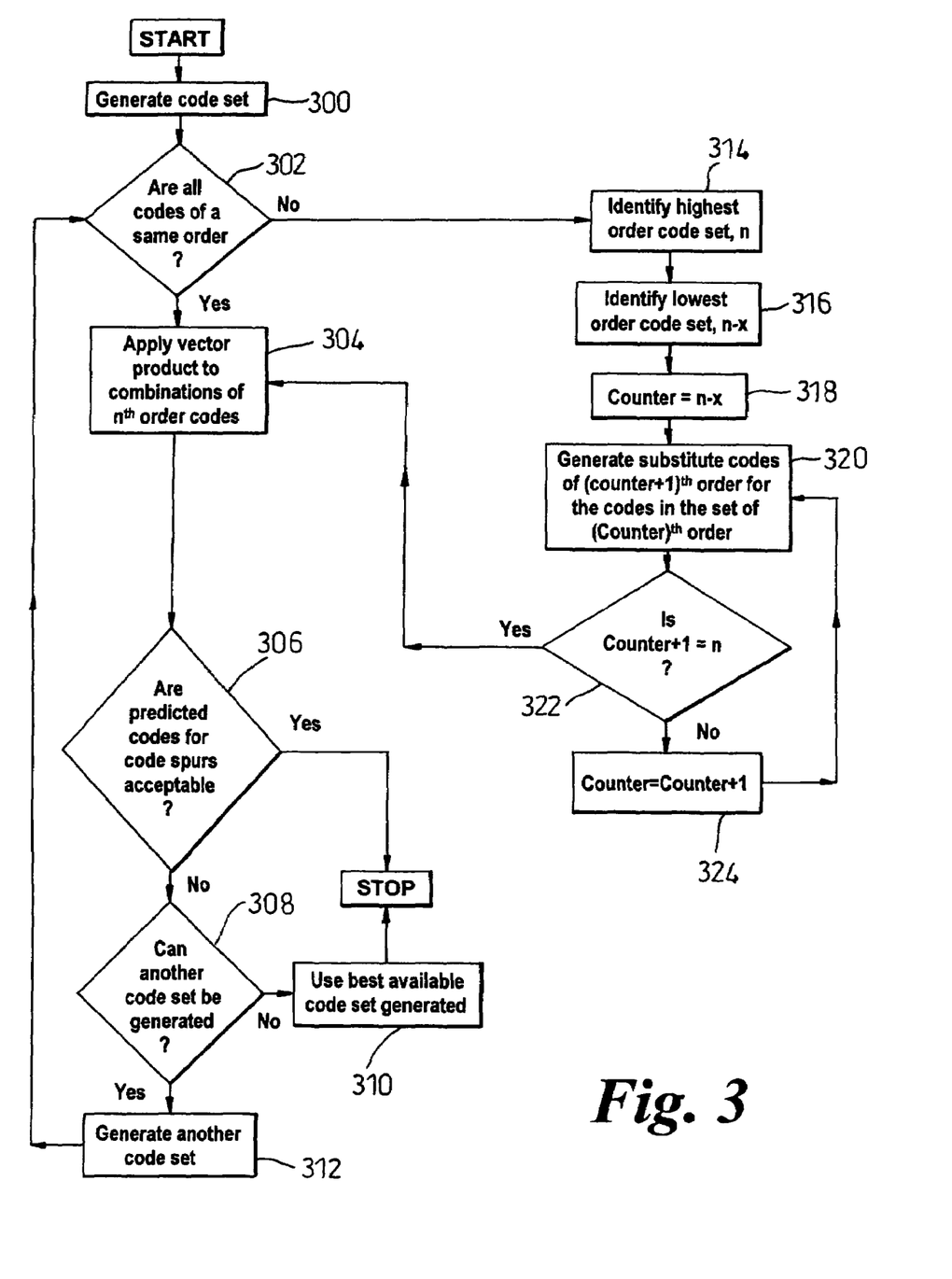
FIG. 3 is a flow diagram of a method for use with the transmitter apparatus of FIG. 2.
Figure 7:
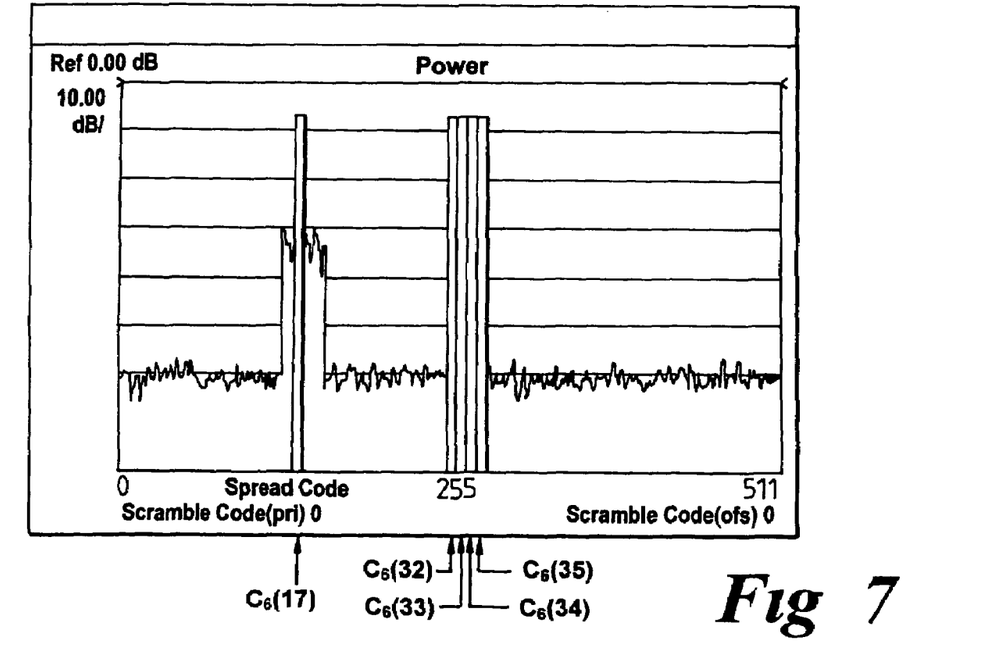

Referring to FIG. 7 in conjunction with FIG. 3, the new second signalling code $C_4(9)$ ultimately needs to be substituted with signalling codes of the sixth order. In order to achieve this, the prediction unit 220 sets (step 318) a counter variable "counter", to the order number, n−x, of the lowest order of codes found in the first set of signalling codes. Subsequently, the prediction unit 220 substitutes (step 320) signalling codes of the $(counter)^{th}$ order with codes from the $(counter+1)^{th}$ order. When doing so, the codes selected from the set of signalling codes of the $(counter+1)^{th}$ order are selected so that they occupy the portion of the code domain occupied by the signalling codes of the $(counter)^{th}$ order. Once this substitution has been achieved, the prediction unit 220 determines (step 322) if substitution with codes of the highest, $n^{th}$, order has been achieved. If not, the counter variable is incremented (step 324) by one and the process of substituting signalling codes that are members of the set of signalling codes of $(counter)^{th}$ order with signalling codes that are members of the set of signalling codes of the $(counter+1)^{th}$ order is repeated. However, it should be appreciated that the repeated substitution process does not only substitute signalling codes of the $(counter)^{th}$ order previously used to substitute codes of the $(counter-1)^{th}$ order, but substitution is also performed of one or more previously unsubstituted signalling codes from the first set of signalling codes that is/are member(s) of the set of signalling codes of the $(counter)^{th}$ order, i.e. active signalling codes at that level plus the substituted codes at the same level are further substituted with codes at the next highest level.

With respect to the context of the example of FIG. 7, the new second signalling code $C_4(9)$ is substituted with orthogonal signalling codes from the set of signalling codes of the fifth order that occupy substantially the same portion of the code domain as the new second signalling code $C_4(9)$. The signalling codes of the fifth order generated to substitute the new second signalling code $C_4(9)$ are then subsequently substituted by orthogonal signalling codes from the set of signalling codes of the sixth order by, in this example, a single repetition of the step 320. This repetition yields a first substitute signalling code $C_6(32)$, a second substitute signalling code $C_6(33)$, a third substitute signalling code $C_6(34)$, a fourth substitute signalling code $C_6(35)$. The first, second, third and fourth substitute signalling codes $C_6(32)$, $C_6(33)$, $C_6(34)$, $C_6(35)$ occupy the same portion of the signalling code domain as the new first signalling code $C_4(9)$.

Since the sixth order is the highest order of signalling codes found in the first set of signalling codes, i.e. all substitute signalling codes have been generated, the prediction unit 220 processes the signalling codes of the $n^{th}$ order from the first set of signalling codes and those generated by executing steps 320 to 324 according to processing steps 304 to 310 described above.

In this example, the result of executing the processing step 304 is the identification of code spurs at spreading codes $C_6(16)$, $C_6(17)$, $C_6(18)$, $C_6(19)$, $C_6(32)$, $C_6(33)$, $C_6(34)$ and $C_6(35)$.

It should be noted that, in the above example, active channels were only present at the highest and lowest levels and that the vector product calculation was therefore applied at the highest level, being the only level at which an odd number of greater than three active/substitute codes existed. In cases where there are three or more levels at which active channels occur, there exists an intermediate step whereby, having substituted codes from the lowest level to a next higher level at which an active signalling code is present, the code spur prediction algorithm should be executed at that level in order to predict code spurs that have signalling codes belonging to that level, i.e. after executing each iteration of the projection process, the above described prediction process of step 304 (at least) can be carried out in respect of the signalling codes that are members of the set of signalling codes of the same order as the order of the signalling codes used to make substitutions in the substitution process. However, the code spur prediction algorithm need only be invoked if a given level comprises an active signalling code.

Once the prediction unit 220 has selected an appropriate set of signalling codes for transmitting symbols respectively on a required number of channels, the appropriate set of signalling codes and symbols to be transmitted are passed to the DSP 204 for use as respective inputs for the number of processing chains 224 via the respective code and symbol inputs 226, 228.

Once the symbols have been processed in accordance with known spread-spectrum, and in particular, W-CDMA techniques, processed digital data is passed to the RF unit 208 via the second data bus 210 for conversion into a composite RF signal that is propagated via the antenna 212.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

What is claimed is:

1. A method of predicting a signalling code from an $n^{th}$ order set of orthogonal signalling codes of length $2^n$ for a communications system, the signalling code corresponding to a code spur, comprising:
    selecting an odd number of at least three signalling codes from the $n^{th}$ order set of orthogonal signalling codes within a code space;
    performing an operation on the at least three signalling codes, the operation corresponding to a vector product of the at least three signalling codes, when the at least three signalling codes are expressed in a bipolar form, to predict the signalling code corresponding to the code spur; and
    identifying signalling codes from the $n^{th}$ order set of orthogonal signalling codes of length $2^n$ having a lower occurrence of code spurs coinciding with active signalling codes than signalling codes amongst the $n^{th}$ order set of orthogonal signalling codes.

2. A method as claimed in claim 1, wherein the at least three signalling codes are seven or less signalling codes.

3. A computer readable medium encoded with computer executable instructions to perform the method as claimed in claim 1.

4. A method of assigning signalling codes for a spread-spectrum communications system, the method comprising:
    compiling a plurality of combinations of orthogonal signalling codes;
    for odd combinations of at least three orthogonal signalling codes from each of the plurality of combinations of signalling codes, predicting at least one signalling code corresponding to at least one respective code spur by performing an operation on the at least three signalling codes, the operation corresponding to a vector product of the at least three signalling codes, when the at least three signalling codes are expressed in a bipolar form, to predict the signalling code corresponding to the code spur; and
    identifying a combination of signalling codes from the plurality of combinations of signalling codes having a lower occurrence of code spurs coinciding with active signalling codes than other combinations of signalling codes amongst the plurality of combinations of signalling codes.

5. A transmitter apparatus for a spread-spectrum communications system, the apparatus comprising:
    a transmitter chain; and
    a processor coupled to the transmitter chain, the processor being arranged to:
        select an odd number of at least three signalling codes from the $n^{th}$ order set of orthogonal signalling codes within a code space,
        perform an operation on the at least three signalling codes, the operation corresponding to a vector product of the at least three signalling codes, when the at least three signalling codes are expressed in a bipolar form, to predict the signalling code corresponding to the code spur; and
        identify signalling codes from the $n^{th}$ order set of orthogonal signalling codes of length $2^n$ having a lower occurrence of code spurs coinciding with active signalling codes than signalling codes amongst the $n^{th}$ order set of orthogonal signalling codes.

6. A base station comprising the transmitter apparatus as claimed in claim 5.

7. A spread-spectrum communications system comprising the transmitter apparatus as claimed in claim 5.

* * * * *